(12) United States Patent
Yanagisawa

(10) Patent No.: US 10,803,122 B2
(45) Date of Patent: *Oct. 13, 2020

(54) LABELED GRAPH ISOMORPHISM ALLOWING FOR FALSE POSITIVE

(71) Applicant: INTERNATIONAL BUSINESS MACHINES CORPORATION, Armonk, NY (US)

(72) Inventor: Hiroki Yanagisawa, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 241 days.

This patent is subject to a terminal disclaimer.

(21) Appl. No.: 15/484,890

(22) Filed: Apr. 11, 2017

(65) Prior Publication Data
US 2018/0293328 A1   Oct. 11, 2018

(51) Int. Cl.
*G06F 16/901*   (2019.01)
*G06K 9/62*   (2006.01)
*G06K 9/68*   (2006.01)

(52) U.S. Cl.
CPC ........ *G06F 16/9024* (2019.01); *G06K 9/6202* (2013.01); *G06K 9/6215* (2013.01); *G06K 9/6232* (2013.01); *G06K 9/6892* (2013.01)

(58) Field of Classification Search
CPC ............ G06F 17/30958; G06K 9/6232; G06K 9/6215; G06K 9/6202
See application file for complete search history.

(56) References Cited

U.S. PATENT DOCUMENTS

2007/0179760 A1   8/2007   Smith
2010/0082648 A1*  4/2010   Potapov ............... G06F 3/0611
                                                   707/756

(Continued)

FOREIGN PATENT DOCUMENTS

CN           104732547          6/2015

OTHER PUBLICATIONS

Zhang, Yijia et al., "Neighborhood hash graph kernel for protein-protein interaction extraction," Journal of Biomedical Informatics 44, pp. 1086-1092 (2011) (Year: 2011).*

(Continued)

*Primary Examiner* — Rehana Perveen
*Assistant Examiner* — Steven W Crabb
(74) *Attorney, Agent, or Firm* — Tutunjian & Bitetto, P.C.; Vazken Alexanian

(57) ABSTRACT

A method is provided for determining graph isomorphism. The method includes initializing a hash value for each of a plurality of vertexes in a first labelled graph and a second labelled graph by assigning an integer value as the hash value, to form a first set of hash values for the vertexes in the first graph and a second set of hash values for the vertexes in the second graph. The integer value for a given vertex is assigned based on a label of the given vertex in the graphs. The method includes performing a determination of whether the first and second labelled graphs are isomorphic, by comparing the first and second sets of hash values. The method includes initiating a performance of an action that changes a state of a controlled object to another state, responsive to the determination. Each graph includes a mixture of hard and soft labels.

18 Claims, 17 Drawing Sheets

(56) References Cited

U.S. PATENT DOCUMENTS

| | | | |
|---|---|---|---|
| 2011/0268364 A1* | 11/2011 | Hido | G06F 16/9024 |
| | | | 382/218 |
| 2016/0110434 A1* | 4/2016 | Kakaraddi | G06F 16/9024 |
| | | | 707/602 |
| 2018/0137155 A1* | 5/2018 | Majumdar | G06N 10/00 |

OTHER PUBLICATIONS

Khan, Arijit et al., "Neighborhood Based Fast Graph Search in Large Networks," SIGMOD 2011 ACM, pp. 1-12 (Year: 2011).*
Definition of Irrespective retrieved from Internet May 8, 2019 https://dictionary.cambridge.org/us/dictionary/english/irrespective (Year: 2019).*
Lei Zhu et al., "A Coding Method for Efficient Subgraph Querying on Vertex and Edge Labeled Graphs," PLOS ONE vol. 9 Issue 5, pp. 1-18 (2014) (Year: 2014).*
Hido, et al., "A Linear-time Graph Kernel", 2009 Ninth IEEE International Conference on Data Mining, pp. 179-188.
Schweitzer, Pascal, "Isomorphism of (mis)labeled Graphs", European Symposium on Algorithms, Sep. 2011, pp. 1-17.

\* cited by examiner

LABELED GRAPH ISOMORPHISM ALLOWING FOR FALSE POSITIVE

BACKGROUND

Technical Field

The present invention relates generally to information processing and, in particular, to labeled graph isomorphism allowing for a false positive.

Descriptions of the Related Art

In chemistry, some atoms of a compound can be replaced with other atoms to create another compound, where the "compound" and the "other compound" can be considered to form a pair. Since such a pair of compounds often have similar chemical properties, we often want to find such a pair of compounds. To do so, we need an algorithm to check if two compounds are such a pair or not.

Since a compound can be represented as a labelled graph, this problem can be modeled as a labelled graph isomorphism problem. Whether or not the (labelled) graph isomorphism problem has an efficient algorithm a polynomial time algorithm) is one of the famous open problems in computer science. Therefore, an easier problem is considered, namely: the labelled graph isomorphism problem allowing for false positive.

Thus, given two labelled graphs, the problem is to determine if the two labeled graphs are isomorphic or not. Two graphs G and H are considered isomorphic if and only if there is a mapping between the sets of vertices of G and H preserving labels such that two vertices are adjacent in G if and only if the corresponding vertices are adjacent in H.

Thus, there is a need for labeled graph isomorphism allowing for a false positive.

SUMMARY

According to an aspect of the present invention, a computer-implemented method is provided for determining graph isomorphism. The method includes initializing, by a processor, a bash value for each of a plurality of vertexes in a first labelled graph and a second labelled graph by assigning an integer value as the hash value, to form a first set of hash values for the vertexes in the first labelled graph and a second set of hash values for the vertexes in the second labelled graph. The integer value for a given vertex from among the plurality of vertexes is assigned based on a label of the given vertex in a corresponding one of the first and the second labelled graphs. The method further includes performing, by the processor, a determination of whether the first labelled graph and the second labelled graph are isomorphic, by comparing the first set of hash values to the second set of hash values. The method also includes initiating, by the processor, a performance of an action that changes a state of a controlled object to another state, responsive to a result of the determination. Each of the first labelled graph and the second labelled graph includes a mixture of hard labels and soft labels.

According to another aspect of the present invention, a computer program product is provided for determining graph isomorphism. The computer program product includes a non-transitory computer readable storage medium having program instructions embodied therewith. The program instructions are executable by a computer to cause the computer to perform at method. The method includes initializing, by a processor, a hash value for each of a plurality of vertexes in a first labelled graph and a second labelled graph by assigning an integer value as the hash value, to form a first set of hash values for the vertexes in the first labelled graph and a second set of hash values for the vertexes in the second labelled graph. The integer value for a given vertex from among the plurality of vertexes is assigned based on a label of the given vertex in a corresponding one of the first and the second labelled graphs. The method further includes performing, by the processor, a determination of whether the first labelled graph and the second labelled graph are isomorphic, by comparing the first set of hash values to the second set of hash values. The method also includes initiating, by the processor, a performance of an action that changes a state of a controlled object to another state, responsive to a result of the determination. Each of the first labelled graph and the second labelled graph includes a mixture of hard labels and soft labels.

According to yet another aspect of the present invention, a computer-implemented method is provided for storing a labelled graph using a Bloom filter. The method includes initializing, by a processor, a hash value for each of a plurality of vertexes in a labelled graph by assigning an integer value as the hash value. The integer value for a given vertex from among the plurality of vertexes is assigned based on a label and a position of the given vertex in the labelled graph. The method further includes updating the hash value for the each of the plurality of vertexes. The bash value for the given vertex is updated based on a vertex specific table created for the given vertex and a previous hash value for the given vertex. The vertex specific table created for the given vertex stores information for a neighborhood of the given vertex. The method also includes computing an output graph hash value based on the updated hash value for the each of the plurality of vertexes and the information stored in the vertex specific table created for the each of the plurality of vertexes. The method additionally includes storing the labeled graph in the Bloom filter, using the output graph hash value as an index for the labelled graph in the Bloom filter.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to labeled graph isomorphism allowing for a false positive.

In practice, an efficient algorithm for the original problem (i.e., the problem without any false positive) can be avoided if there is an efficient algorithm for the problem that allows false positive. For example, consider the case where hundreds of thousands of pairs of graphs are given and the intent is to find a pair of graphs that are isomorphic. The first step is to run the efficient algorithm described herein to check if the pairs of graphs are isomorphic or not, and a (typically small) set of pairs of graphs can be identified that are candidates of isomorphic pairs of graphs. The set of pairs of graphs may include non-isomorphic pairs of graphs, because the efficient algorithm may sometimes determine the non-isomorphic pairs of graphs as isomorphic. Then, a (slow) exact algorithm can be run to find the isomorphic pair of graphs from the small set of candidates, thus significantly reducing the overall search time.

It is to be appreciated that since the labelled graph isomorphism problem has applications in various areas, the present invention is directed to solving the (more general) labelled graph isomorphism rather than just applying the present invention for chemistry. These and other applications and extensions of the present invention are readily determined by one of ordinary skill in the art, given the teachings of the present invention provided herein, while maintaining the spirit of the present invention. Thus, while one or more examples may be described herein regarding chemistry, the same can be readily adapted to other applications.

Figure 1:
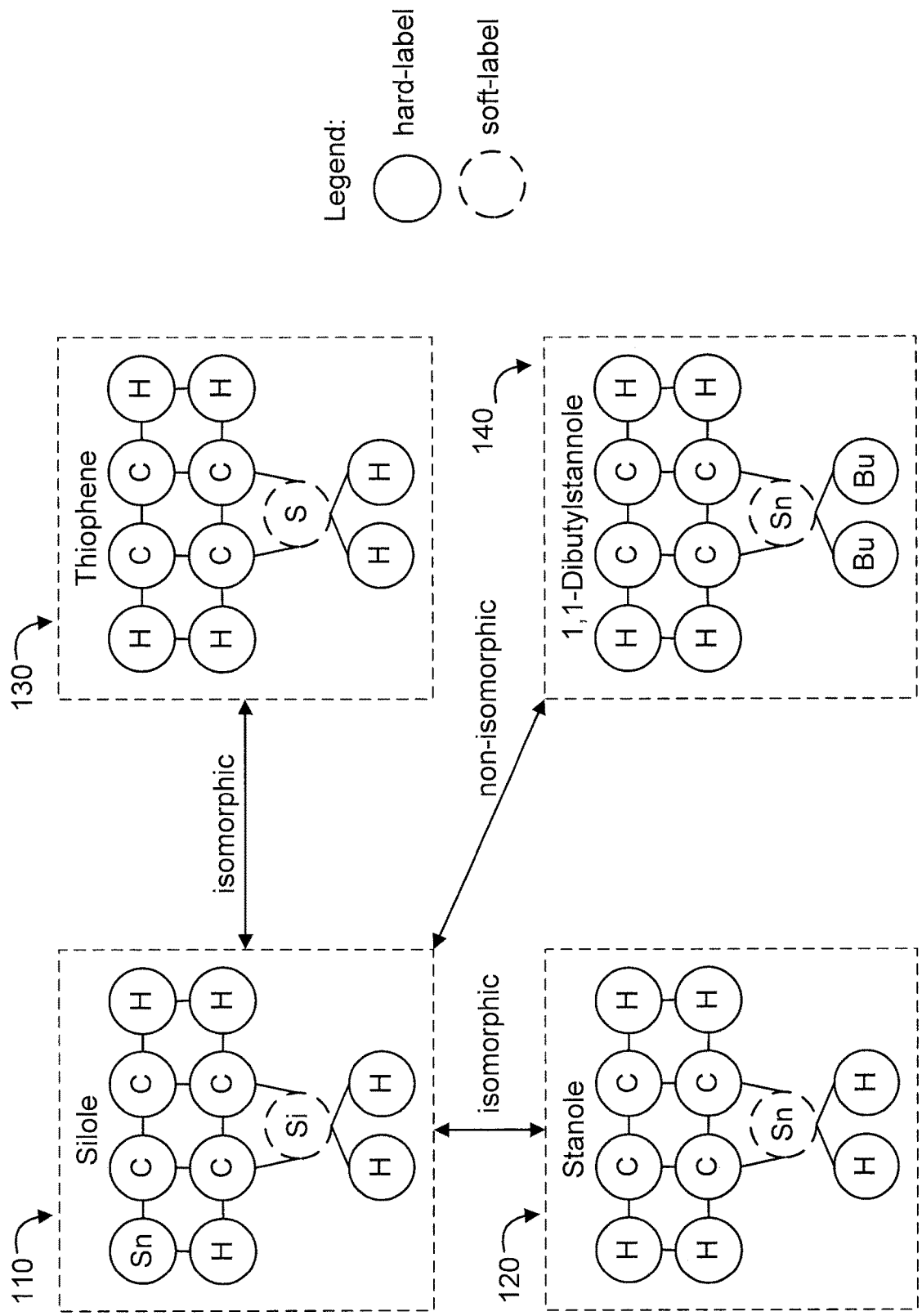
FIG. 1 shows exemplary isomorphic graphs and a non-isomorphic graph, with respect to a reference graph, in accordance with an embodiment of the present invention.

FIG. 1 shows exemplary isomorphic graphs 120 and 130 and a non-isomorphic graph 140, with respect to a reference graph 110, in accordance with an embodiment of the present invention. Reference graph 110 is for the compound Silole, isomorphic graph 120 is for the compound Stanole, isomorphic graph 130 is for the compound Thiophene, and non-isomorphic graph 140 is for the compound 1,1-Debutylstannole. Hard-labels are shown with a solid circle, while soft-labels are shown with a dashed circle.

Thus, in the case of FIG. 1, the task is to find a compound that has a similar structure to Silole (in graph 110) on the condition that the Si is replaced with another atom. Hence, the problem is to find a compound that is isomorphic to the labelled graph representation of Silole where Si is the soft-label and the other atoms are hard-labels.

As noted above, two graphs G and H are considered isomorphic if and only if there is a mapping between the sets of vertices of G and H preserving labels such that two vertices are adjacent in G if and only if the corresponding vertices are adjacent in H.

In the mapping, the hard-labels must coincide, while we allow consistent renaming for soft-labels. For example, graph 110 (Silole) is isomorphic to graph 130 (Thiophene) because we can replace Si (in graph 110) with S (in graph 130).

Figure 2:
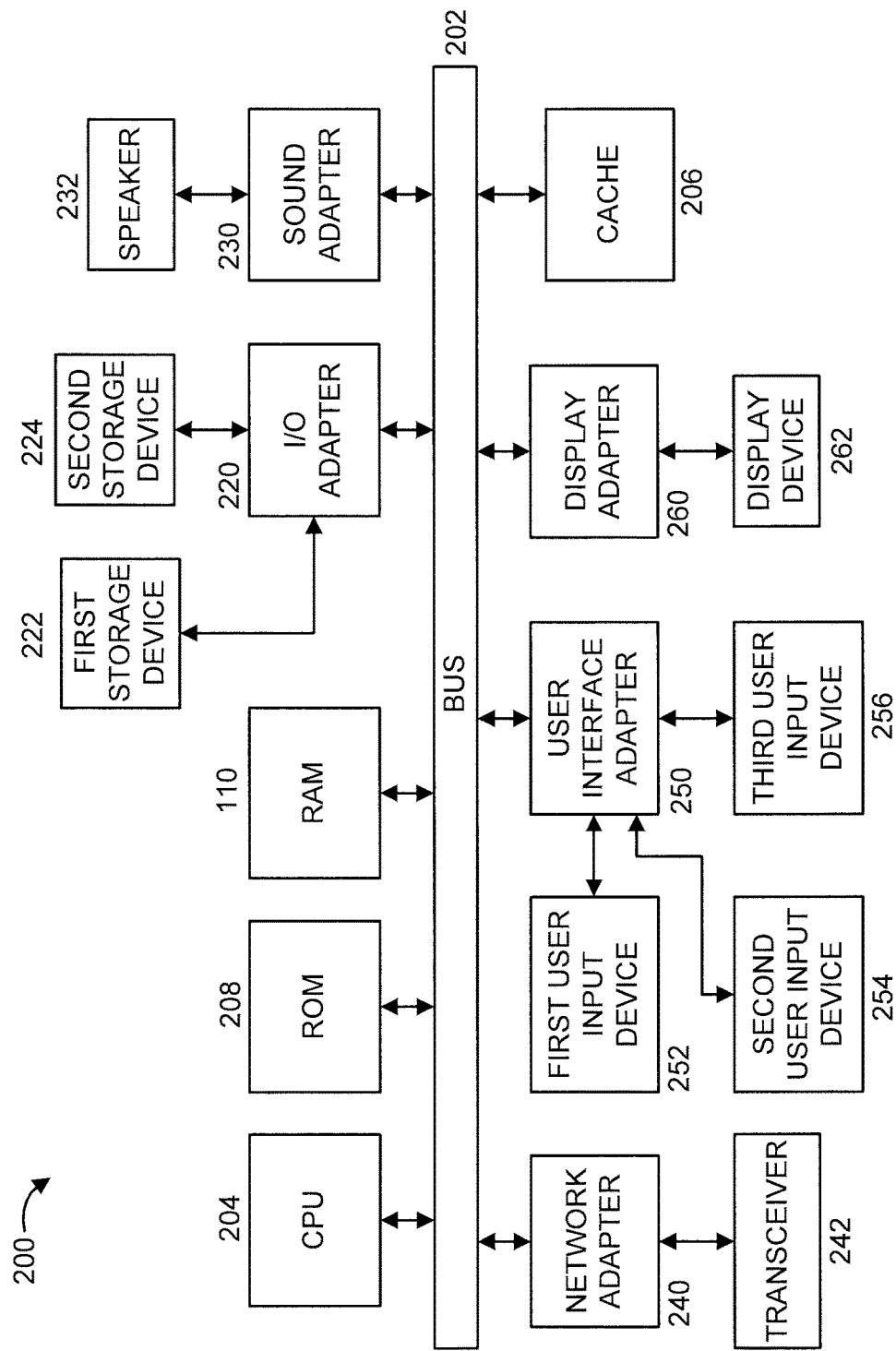
FIG. 2 shows an exemplary processing system to which the invention principles may be applied, in accordance with an embodiment of the present invention.

FIG. 2 shows an exemplary processing system 200 to which the invention principles may be applied, in accordance with an embodiment of the present invention. The processing system 100 includes at least one processor (CPU) 204 operatively coupled to other components via a system bus 202. A cache 206, a Read Only Memory (ROM) 208, a Random Access Memory (RAM) 210, an input/output (I/O) adapter 220, a sound adapter 230, a network adapter 240, a user interface adapter 250, and a display adapter 260, are operatively coupled to the system bus 202.

A first storage device 222 and a second storage, device 224 are operatively coupled to system bus 202 by the I/O adapter 220. The storage devices 222 and 224 can be any of a disk storage device e.g., a magnetic or optical disk storage device), a solid state magnetic device, and so forth. The storage devices 222 and 224 can be the same type of storage device or different types of storage devices.

A speaker 232 is operatively coupled to system bus 202 by the sound adapter 230. A transceiver 242 is operatively coupled to system bus 202 by network adapter 240. A display device 262 is operatively coupled to system bus 202 by display adapter 260.

A first user input device 252, a second user input device 254, and a third, user input device 256 are operatively coupled to system bus 202 by user interface adapter 250. The user input devices 252, 254, and 256 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 252, 254, and 256 can be the same type of user input device or different types of user input devices. The user input devices 252, 254, and 256 are used to input and output information to and from system 200.

Of course, the processing system 200 may also include other elements (not shown), as readily contemplated by one of skill in the art, as well as omit certain elements. For example, various other input devices and/or output devices can be included in processing system 200, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 200 are readily contemplated by one of ordinary skill in the art given the teachings of the present invention provided herein.

Figure 3:
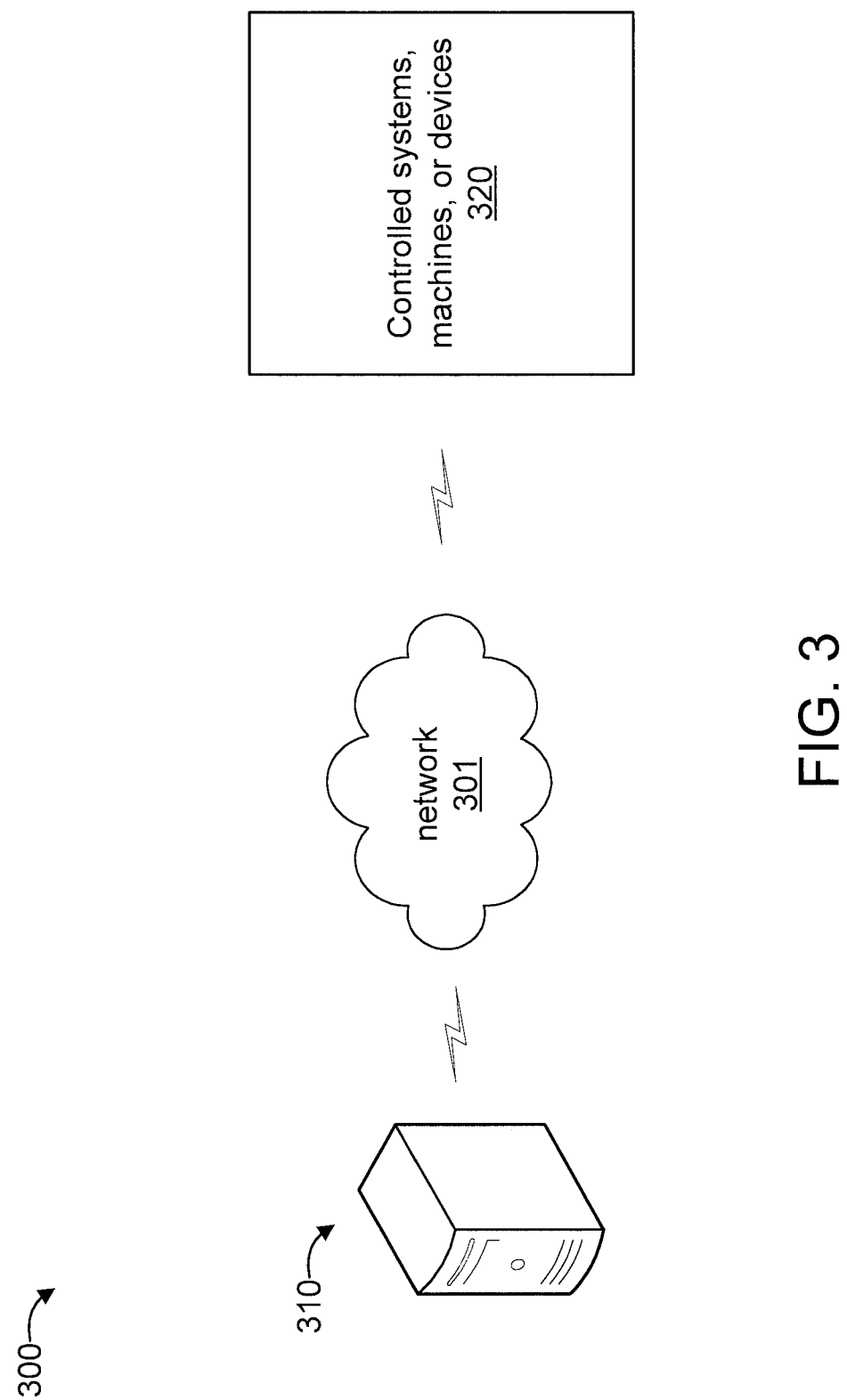
FIG. 3 shows an exemplary environment to which the present invention can be applied, in accordance with an embodiment of the present invention.

Moreover, it is to be appreciated that environment 300 described below with respect to FIG. 3 is an environment for implementing respective embodiments of the present invention. Part or all of processing system 200 may be implemented in one or more of the elements of environs cent 300.

Figure 4:
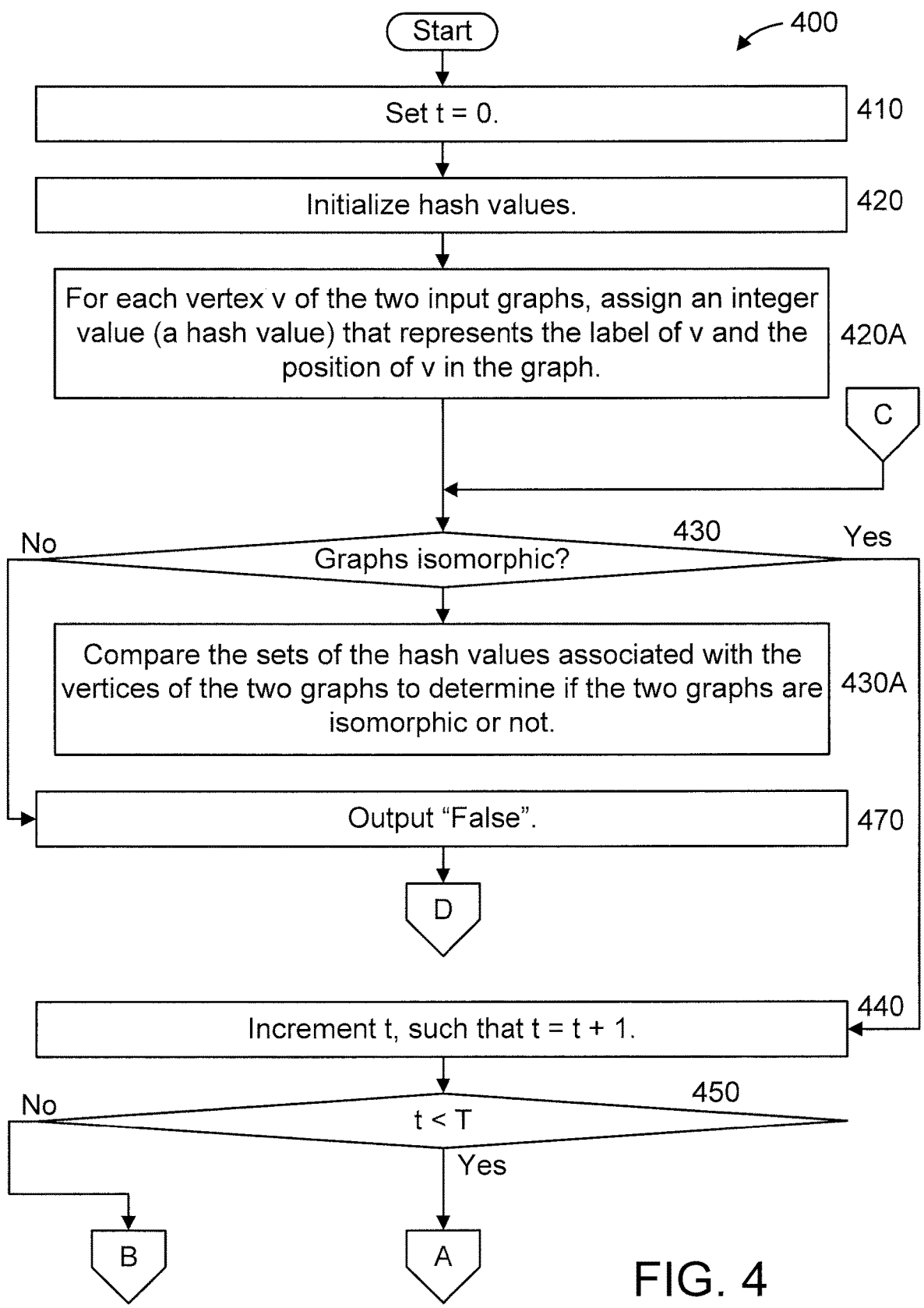
FIGS. 4-5 show an exemplary method for determining whether two labeled graphs are isomorphic and an exemplary post-method step, allowing for a false positive, in accordance with an embodiment of the present invention.
Figure 8:
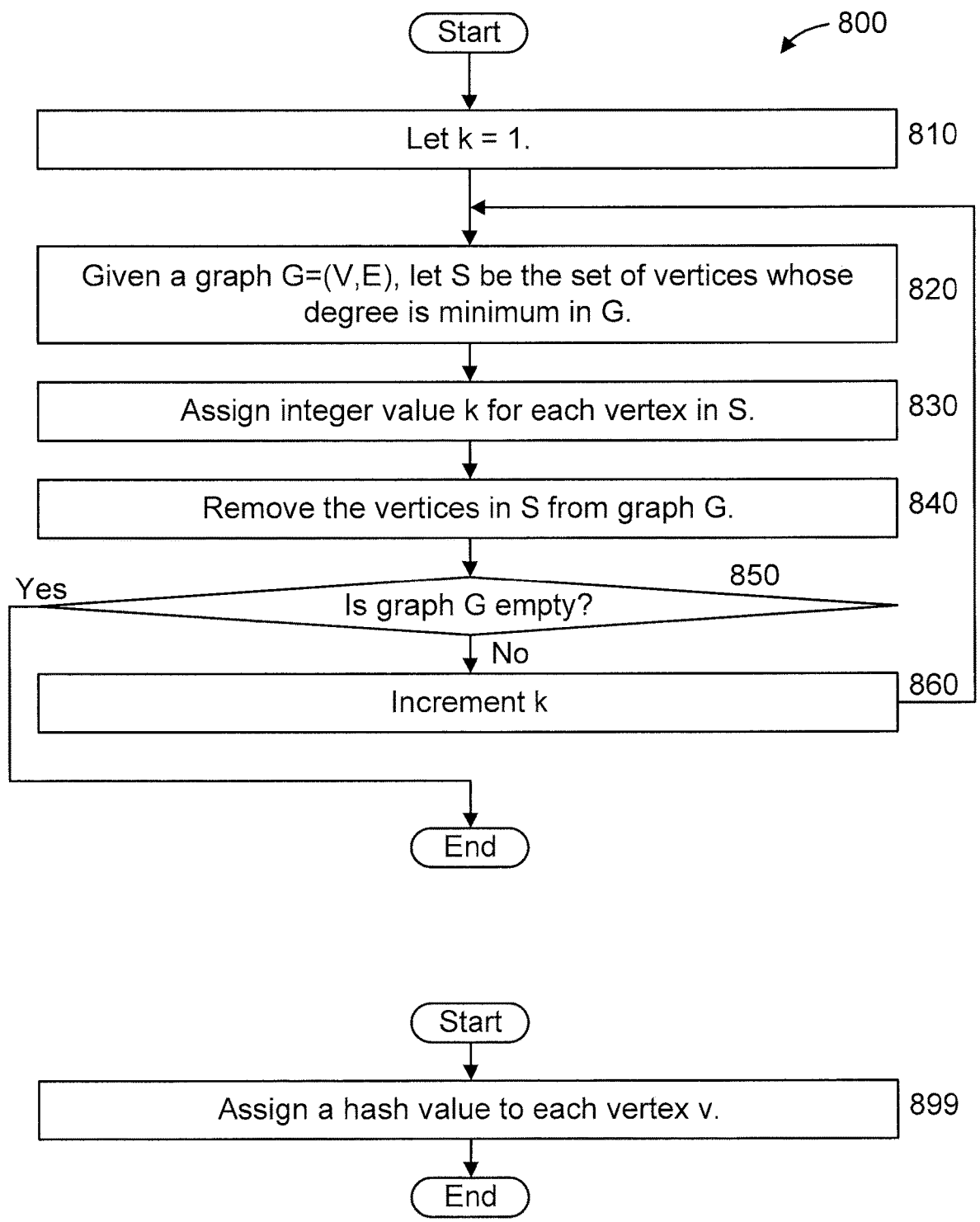
FIG. 8 shows an exemplary greedy integer value assignment method and a post-method step, in accordance with an embodiment of the present invention.
Figure 10:
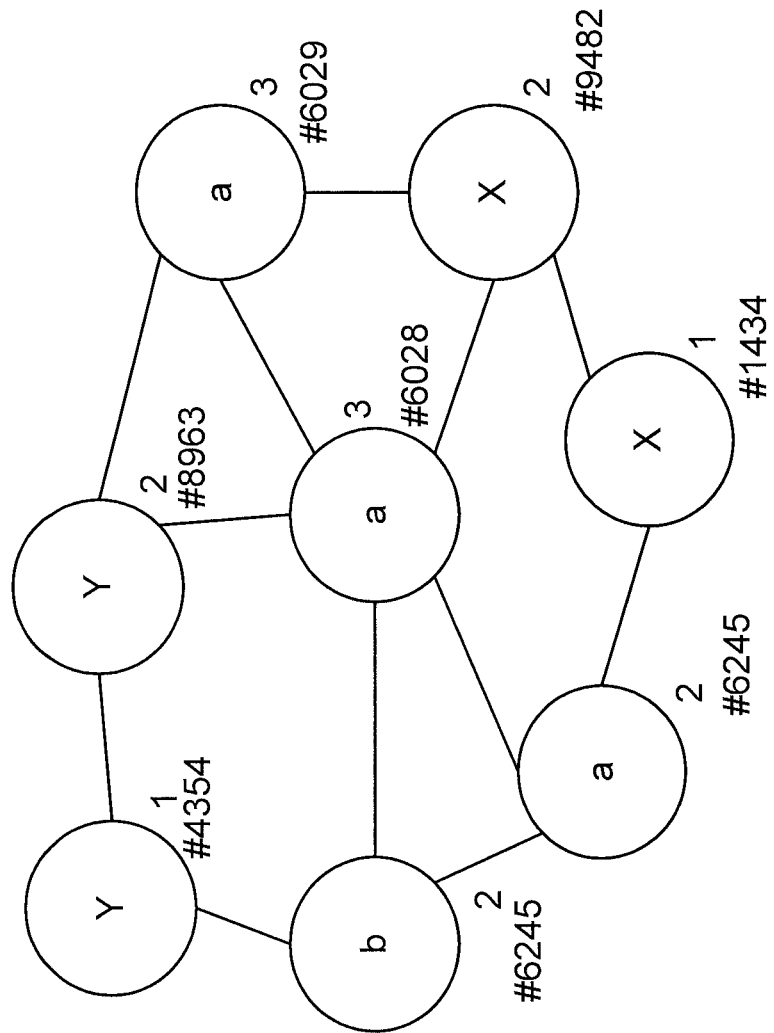
FIG. 10 shows the set of vertices S at a step of the greedy integer value assignment method of FIG. 8, in accordance with an embodiment of the present invention.
Figure 12:
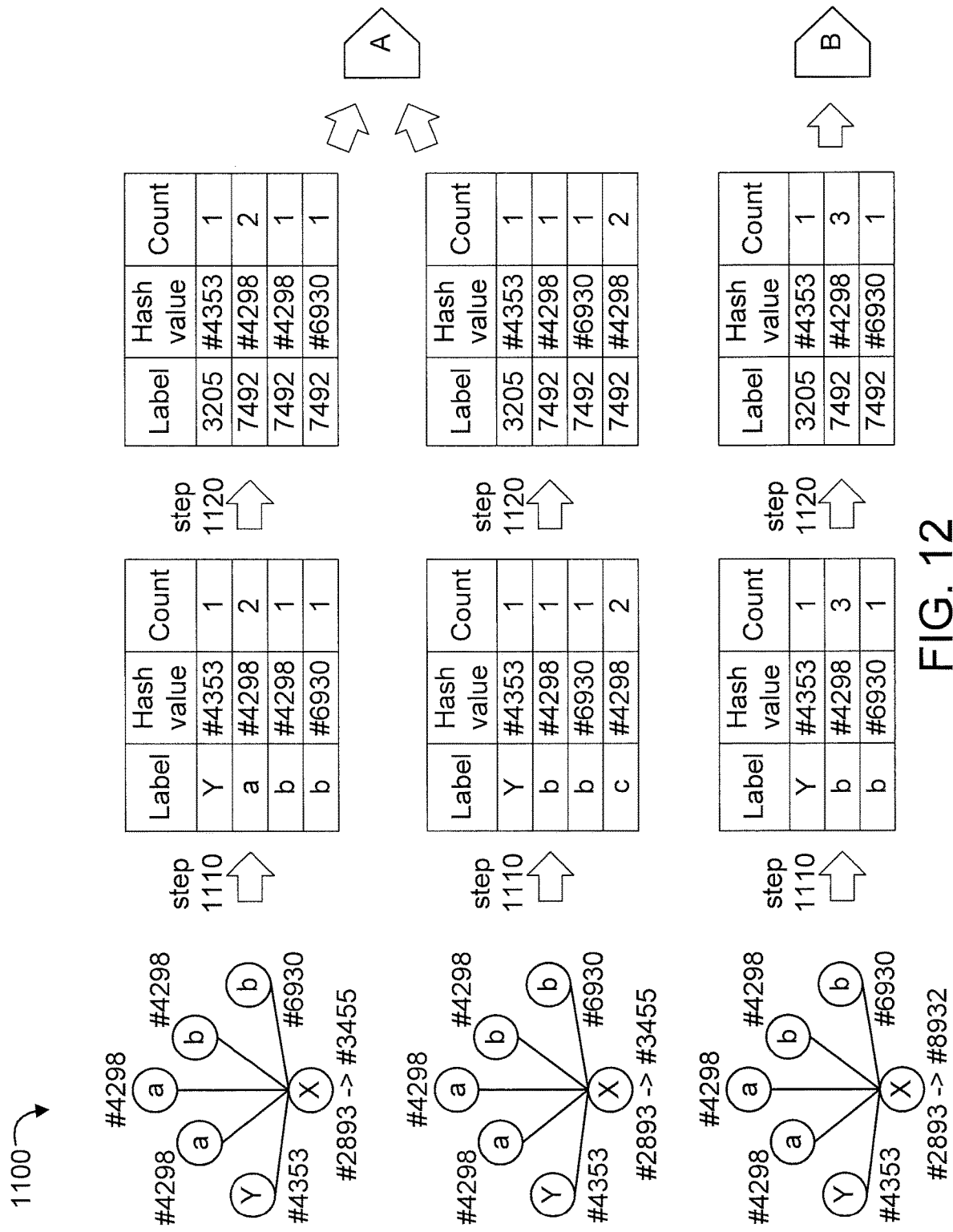
FIGS. 12-13 graphically show the method of FIG. 11, in accordance with an embodiment of the present invention.

Further, it is to be appreciated that processing system 200 may perform at least part of the method described herein including, for example, at least part of method 400 of FIG. 4 and/or at least part of method 800 of FIG. 8 and/or at least part of method 870 of FIG. 10 and/or at least part of method 1100 of FIG. 12. Similarly, part or all of environment 300 may be used to perform at least part of method 400 of FIG. 4 and/or at least part of method 800 of FIG. 8 and/or at least part of method 870 of FIG. 10 and/or at least part of method 1100 of FIG. 12.

FIG. 3 shows an exemplary environment 300 to which, the present invention can be applied, in accordance with an embodiment of the present invention. The environment 300 is representative of a computer network to which the present invention can be applied. The elements shown relative to FIG. 3 are set forth for the sake of illustration. However, it is to be appreciated that the present invention can be applied to other network configurations and other operational environments as readily contemplated by one of ordinary skill in the art given the teachings of the present invention provided herein, while maintaining the spirit of the present invention.

The environment 300 at least includes at least one computer processing system 310 and at least one controlled system(s), machine(s), and/or device(s) (individually and collectively denoted by the reference numeral 320 and hereinafter referred to as "controlled system, machine, and/or device"). For the sake of simplicity and illustration, the preceding elements are shown in singular form, but can be readily extended to more than one of any of the preceding elements as readily appreciated by one of ordinary skill in the art given the teachings of the present invention provided herein, while maintaining the spirit of the present invention. The computer processing system 310 can be any type of computer processing system including, but not limited to, a server, a desktop computer, a laptop computer, a tablet, a smart phone, a media playback device, and so forth, depending upon the particular implementation. For the sake of illustration, the computer processing system 310 is a server.

The computer processing system 310 is configured to solve the problem of labeled graph isomorphism allowing for a false positive. Moreover, the computer processing system 310 is configured to perform an action (e.g., a control action) on the controlled system, machine, and/or device 320 responsive to the labeled graph isomorphism allowing for a false positive. Such action can include, but is not limited to, one or more of: powering down the controlled system, machine, and or device 320 or a portion thereof; identifying a substitute of an item; recommending (to a user, a machine, a service, etc.) the substitute for the item in place of the item, replacing an item by the substitute of the item: retrieve (or cause to be retrieved) the substitute for the item; and so forth. For example, in an embodiment, element 320 can be implemented as a robot that replaces the item with the substitute item. As is evident to one of ordinary skill in the art, the action taken is dependent upon the application to which the present invention is applied.

In the embodiment shown in FIG. 3, the elements thereof are interconnected by a network(s) 301. However, in other embodiments, other types of connections (e.g., wired, etc.) can also be used. Additionally, one or more elements in FIG. 3 may be implemented by a variety of devices, which include but are not limited to, Digital Signal Processing (DSP) circuits, programmable processors, Application Specific integrated Circuits (ASICs), Field Programmable Gate Arrays (FPGAs), Complex Programmable Logic Devices (CPLDs), and so forth. These and other variations of the elements of environment 300 are readily determined by one of ordinary skill in the art, given the teachings of the present invention provided herein, while maintaining the spirit of the present invention.

Figure 5:
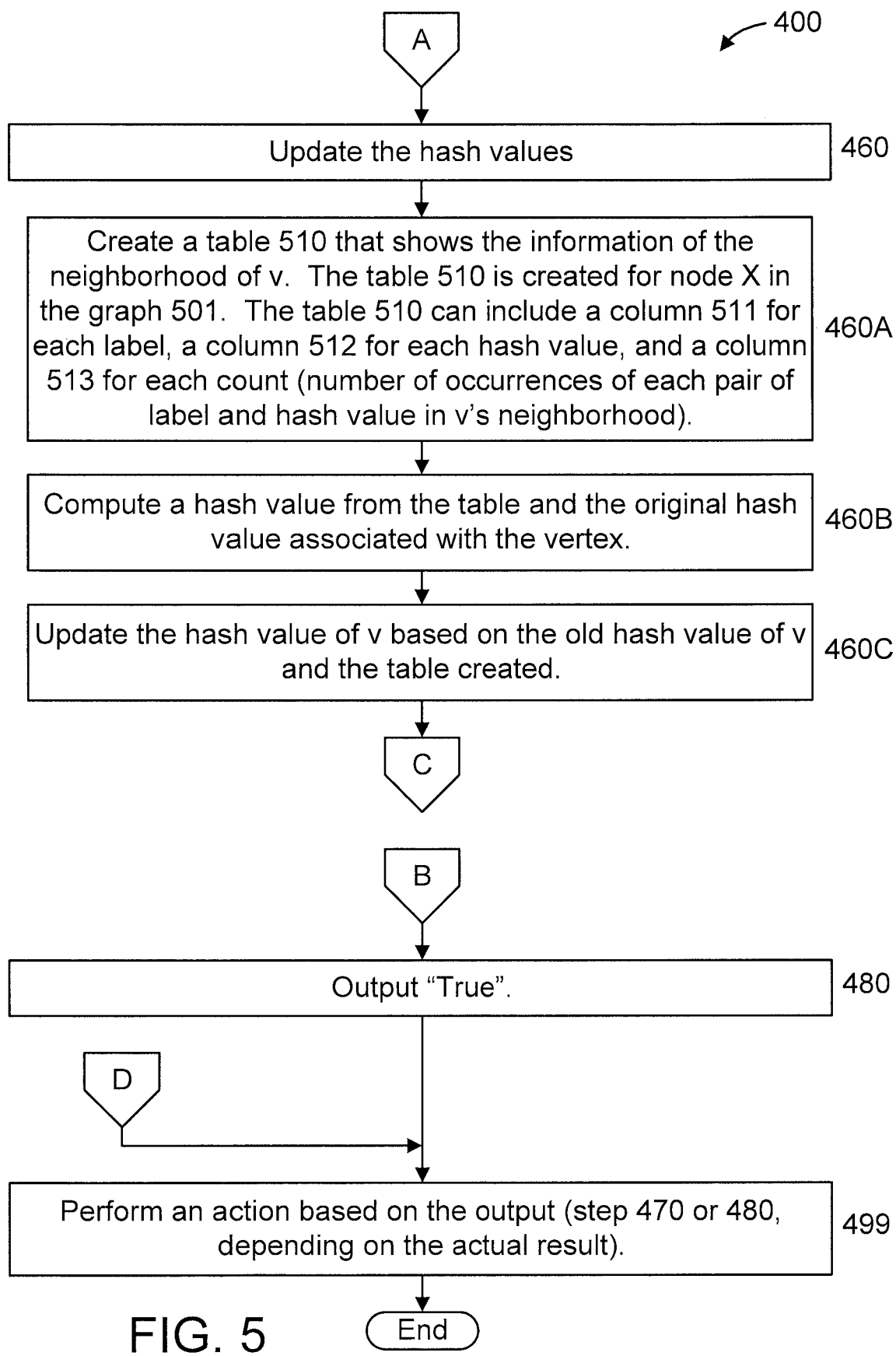

FIGS. 4-5 show an exemplary method 400 for determining whether two labeled graphs are isomorphic and an exemplary post-method step 499, allowing for a false positive, in accordance with an, embodiment of the present invention.

In an embodiment, the input to method 400 includes two undirected graphs such that each vertex is labelled (by a soft-label or a hard-label).

In an embodiment, it can be presumed that the two graphs have the same numbers of the vertices and edges. Otherwise, it would be known that the output should be "False" without running method 400.

In an embodiment, a positive integer parameter T is used to specify the maximum number of iterations of the loop.

At step 410, set t=0.

At step 420, initialize hash values.

In an embodiment, step 420 includes step 420A.

At step 420A, for each vertex v of the two input graphs, assign an integer value (a hash value) that represents the label of v and the position of v in the graph.

At step 430, determine, using a "quick" graph isomorphism test, whether the two graphs are isomorphic. If so, then continue to step 440. Otherwise, continue to step 470.

In an embodiment, step 430 includes step 430A.

At step 430A, compare the sets of the hash values associated with the vertices of the two graphs to determine if the two graphs are isomorphic or not.

At step 440, increment t, such that t=t+1.

At step 450, determine whether t<T. If so, then continue to step 460. Otherwise, continue to step 480.

At step 460, update the hash values (and return to step 430).

Figure 6:
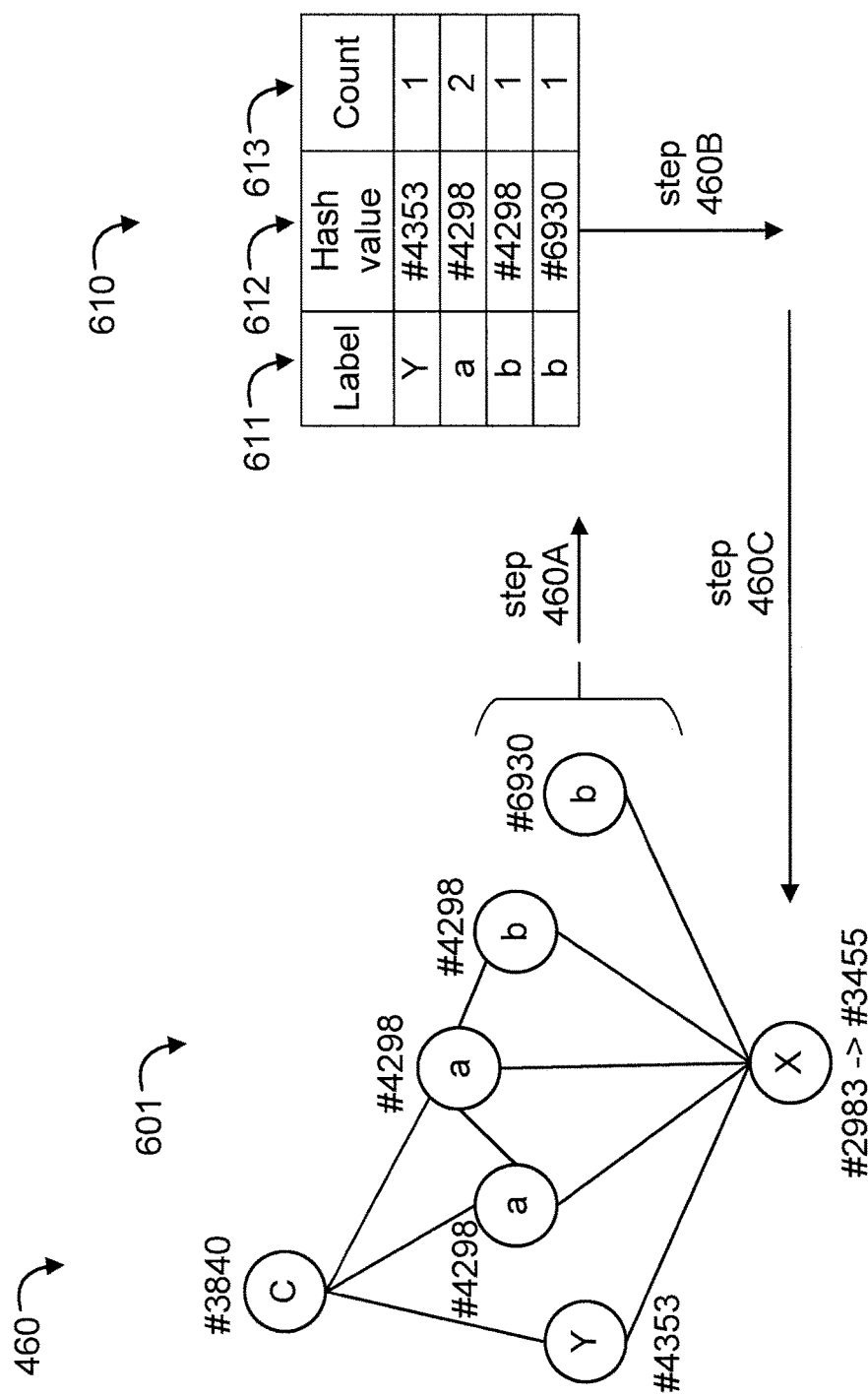
FIG. 6 graphically shows a step of the method of FIGS. 4-5, in accordance with an embodiment of the present invention.

In an embodiment, step 460 includes steps 460A-460C. FIG. 6 graphically shows step 460 (in particular, steps 460A-460C) of the method 400 of FIGS. 4-5, in accordance with an embodiment of the present invention. Steps 460A-460C are performed for each vertex v in graph 601.

At step 460A, create a table 610 that shows the information of the neighborhood of v. The table 61 is created for node X in the graph 601. In an embodiment, the table 610 can include a column 611 for each label, a column 612 for each hash value, and a column 613 for each count (number of occurrences of each pair of label and hash value in v's neighborhood).

At step 460B, compute a hash value from the table 610 and the original hash value associated with the vertex.

At step 460C, update the hash value of v based on the old hash value of v and the table 610 created.

At step 470, output "False".

At step 480, output "True".

At step 499, perform an action based on the output (step 470 or 480, depending on the actual result). For example, in an embodiment, the action is a control action on a controlled system, machine, and/or device (e.g., element 320 in FIG. 3) that is based on the output. As a further example, the action can involve changing the state of an object to another state.

Further to the preceding, examples include changing a power state (on to off), a position (down to up, up to down, left to right, right to left, etc.), and so forth. Regarding position, as an example, one graph can be a reference graph and the other graph can represent a current state of the waterway relating to a bridge such that in the case of non-isomorphism, the presence of a boat can be presumed, and the bridged raised in response. As another example, the object being controlled can be a car, where the motion (speed, direction, etc.) of the car is changed based on the output. The preceding are but some of a myriad of possible applications to which a result of the present invention can be applied, while maintaining the spirit of the present invention.

Regarding the time complexity of method 400, the same runs in almost linear time (specifically, $O(|V| \log |V|+|E|)$ time where $|V|$ represents the number of vertices and $|E|$ represents the number of edges in the input graph).

FIGS. 7-10 further show step 420 of the method 400 of FIGS. 4-5, in accordance with an embodiment of the present invention.

Figure 7:
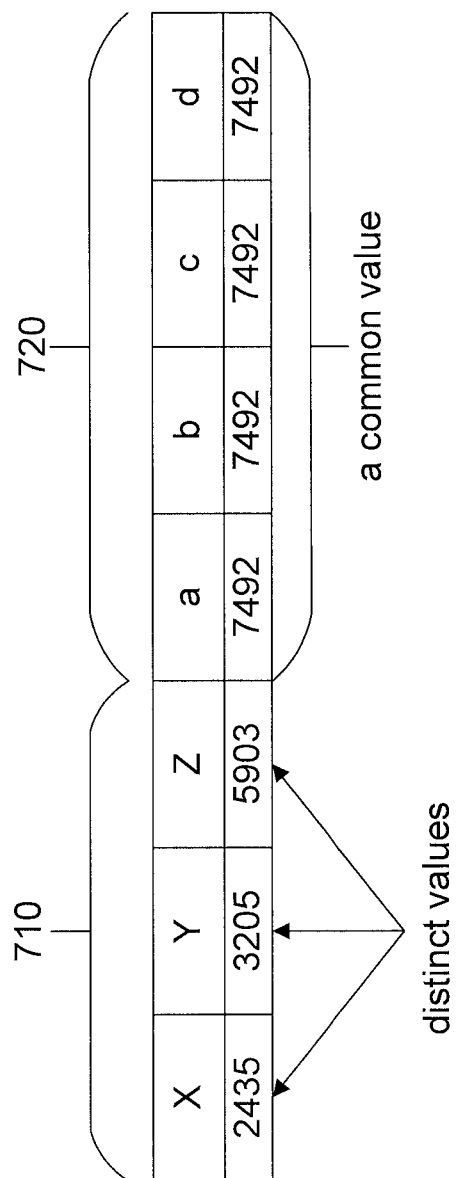
FIG. 7 shows exemplary hard labels and soft-labels and their corresponding values, in accordance with an embodiment of the present invention.

In particular, FIG. 7 shows exemplary hard labels 710 and soft-labels 720 and their corresponding values, in accordance with an embodiment of the present invention. In preparation for step 720, we assign (random) numbers for hard and soft labels. For example, for each hard-label, a distinct integer value (a random value) is assigned, while for soft-labels, a common integer value (a random value) is assigned.

Figure 9:
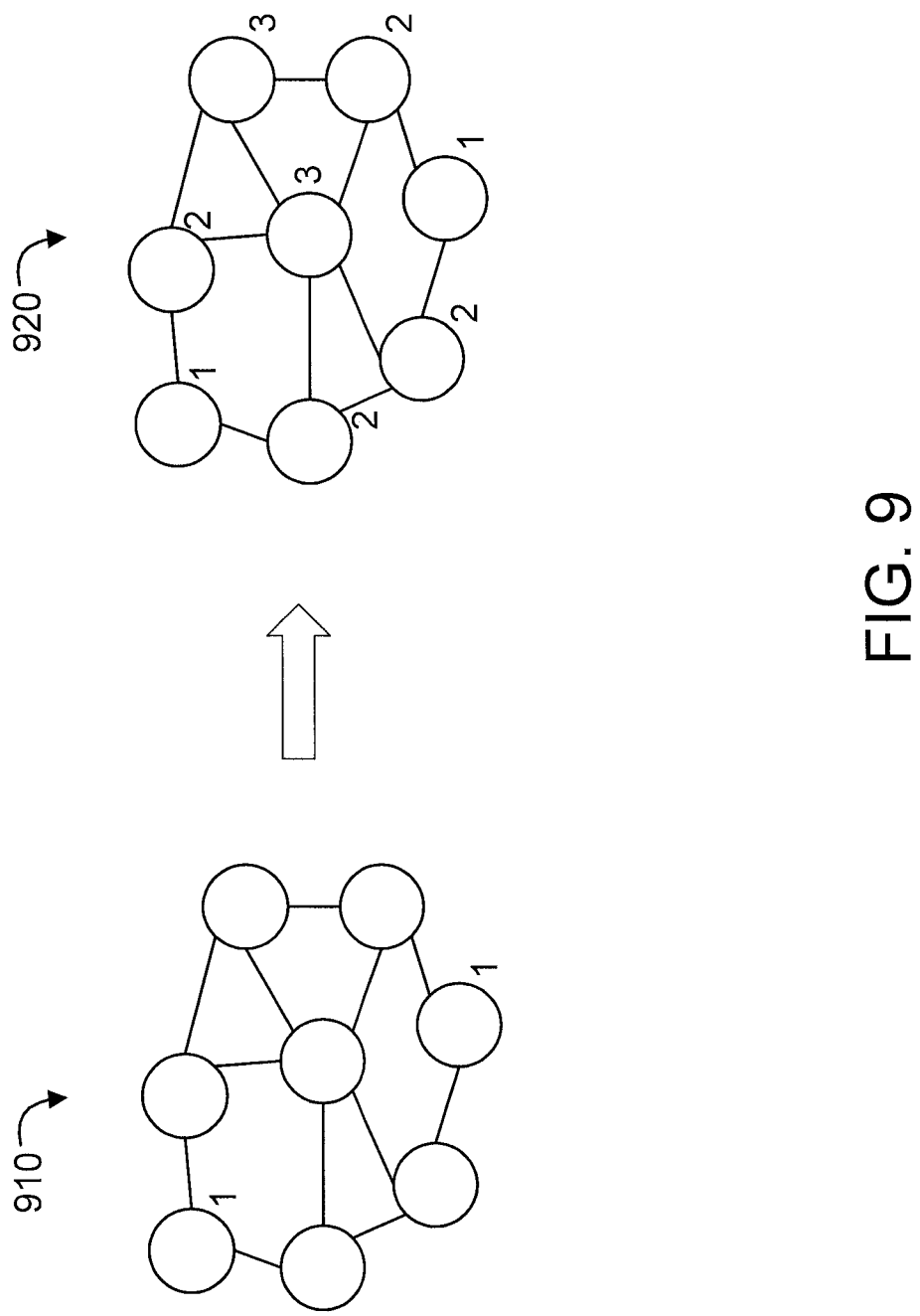
FIG. 9 shows an, exemplary set of vertices S in a first iteration of the greedy integer value assignment method of FIG. 8, and the set of vertices S at the output of the greedy integer value assignment method of FIG. 8, in accordance with an embodiment of the present invention.

FIG. 8 shows an exemplary greedy integer value assignment method 800 and a post-method step 899, in accordance with an embodiment of the present invention. FIG. 9 shows an exemplary set of vertices S in a first iteration 910 of the greedy integer value assignment method 800 of FIG. 8, and the set of vertices S at the output 920 of the greedy integer value assignment method 800 of FIG. 8, in accordance with an embodiment of the present invention. The greedy integer value assignment method 800 assigns an integer value for each vertex by using the following algorithm.

At step 810, let k=1.

At step 820, given a graph G=(V,E), let S be the set of vertices whose degree is minimum in G. (Note that S may contain multiple vertices if there is a tie.)

At step 830, assign integer value k for each vertex in S.

At step 840, remove the vertices in S from graph G.

At step 850, determine if G is empty. If so, then the method is terminated. Otherwise, proceed to step 860.

At step 860, increment k (and return to step 820).

At step 899, assign a hash value to each vertex v. The hash value is computed from the integer value assigned in the above algorithm and the value that corresponds to v's label. Step 899 can be performed, for example, at the conclusion of performing method 800.

FIG. 10 shows the set of vertices S at step 899 of the greedy integer value assignment method 800 of FIG. 8, in accordance with an embodiment of the present invention. As shown, a hash value is computed for each vertex.

A description will now be given regarding other variants of step 420 (the step of "initializing the hash values") of method 400 of FIG. 4, in accordance with an embodiment of the present invention.

In an embodiment, in step 420, we can use any algorithm that assigns a hash value to each vertex v based on v's label and v's position in the graph.

In an embodiment relating to the above implementation of the greedy integer value assignment method 800 of FIG. 8, we extract the set of vertices S whose degree is "minimum" in graph G, but we can use "maximum" instead.

In an embodiment, we can simply assign the degree of vertex as the integer value, instead of using the complex greedy integer assignment method 800 of FIG. 8.

In a further simplified embodiment, we can skip the greedy integer value assignment method 800 of FIG. 8, and assign the hash value solely based on the label of each vertex.

Figure 11:
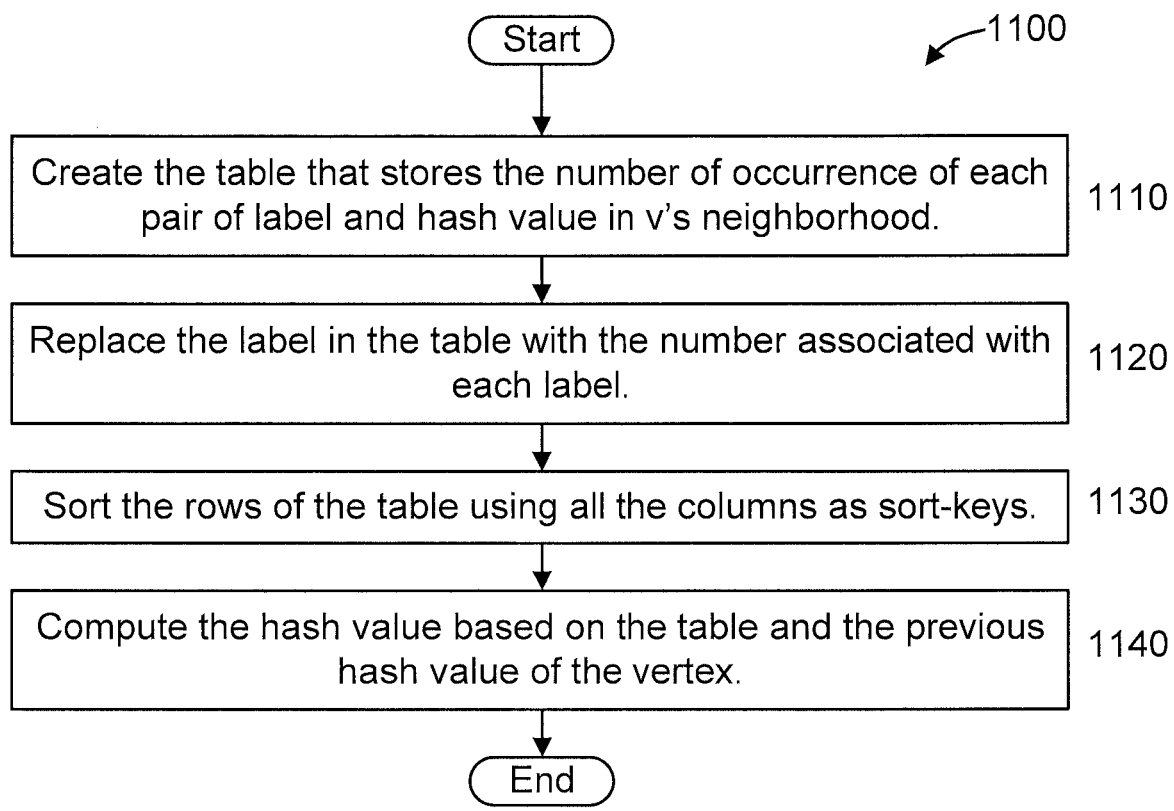
FIG. 11 shows an exemplary method for performing a step of the method fit FIGS. 4-5, in accordance with an embodiment of the present invention.

FIGS. 11-12 further show step 460 of the method 400 of FIGS. 4-5, in accordance with an embodiment of the present invention.

Figure 13:
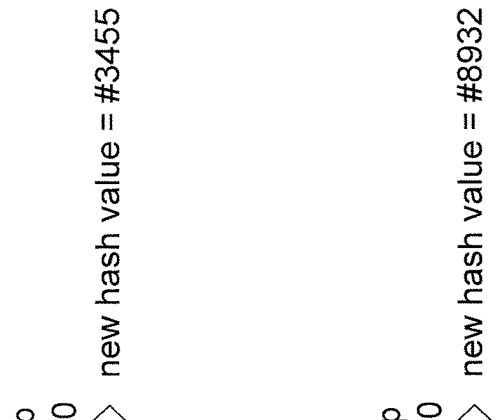

In particular, FIG. 11 shows an exemplary method 1100 for performing step 460 of the method 400 of FIGS. 4-5, in accordance with an embodiment of the present invention. FIGS. 12-13 graphically show the method 1100 of FIG. 11, in accordance with an embodiment of the present invention.

When we update the hash-values, we use a hash function such that the computed hash-value is consistent even if the soft-labels are renamed.

In an embodiment, one implementation to compute a hash value for vertex v is shown by steps 1110-1140.

At step 1110, create the table that stores the number of occurrence of each pair of label and hash value in v's neighborhood.

At step 1120, replace the label in the table with the number associated with each label.

At step 1130, sort the rows of the table using all the columns as sort-keys.

At step 1140, compute the hash value based on the table and the previous hash value of the vertex.

It is to be appreciated that steps 1130 and 1140 are used to determine if two tables are the same or not, ignoring the order of the rows. Accordingly, given the teachings of the present invention provided herein, one of ordinary skill in the art will contemplate the preceding and other implementations, while maintaining the spirit of the present invention.

A description will now be given regarding an exemplary extension of the present invention directed to a Bloom filter, in accordance with an embodiment of the present invention.

When we want to store labelled graphs in a Bloom Filter, an algorithm is needed to compute a hash value from a given graph.

Figure 14:
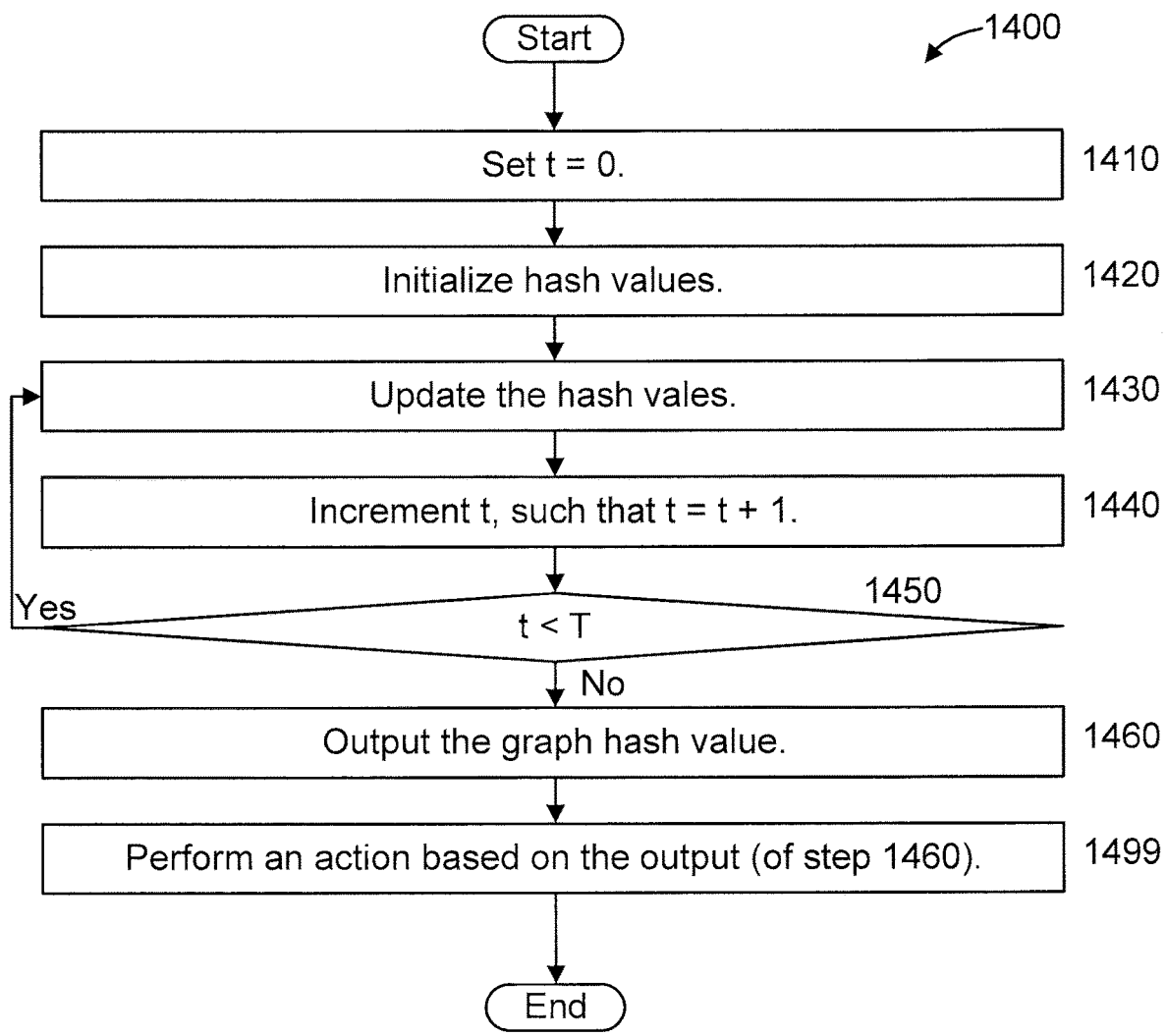
FIG. 14 shows an exemplary method for computing a hash value from a graph and an exemplary post-method step, in accordance with an embodiment of the present invention.
Figure 15:
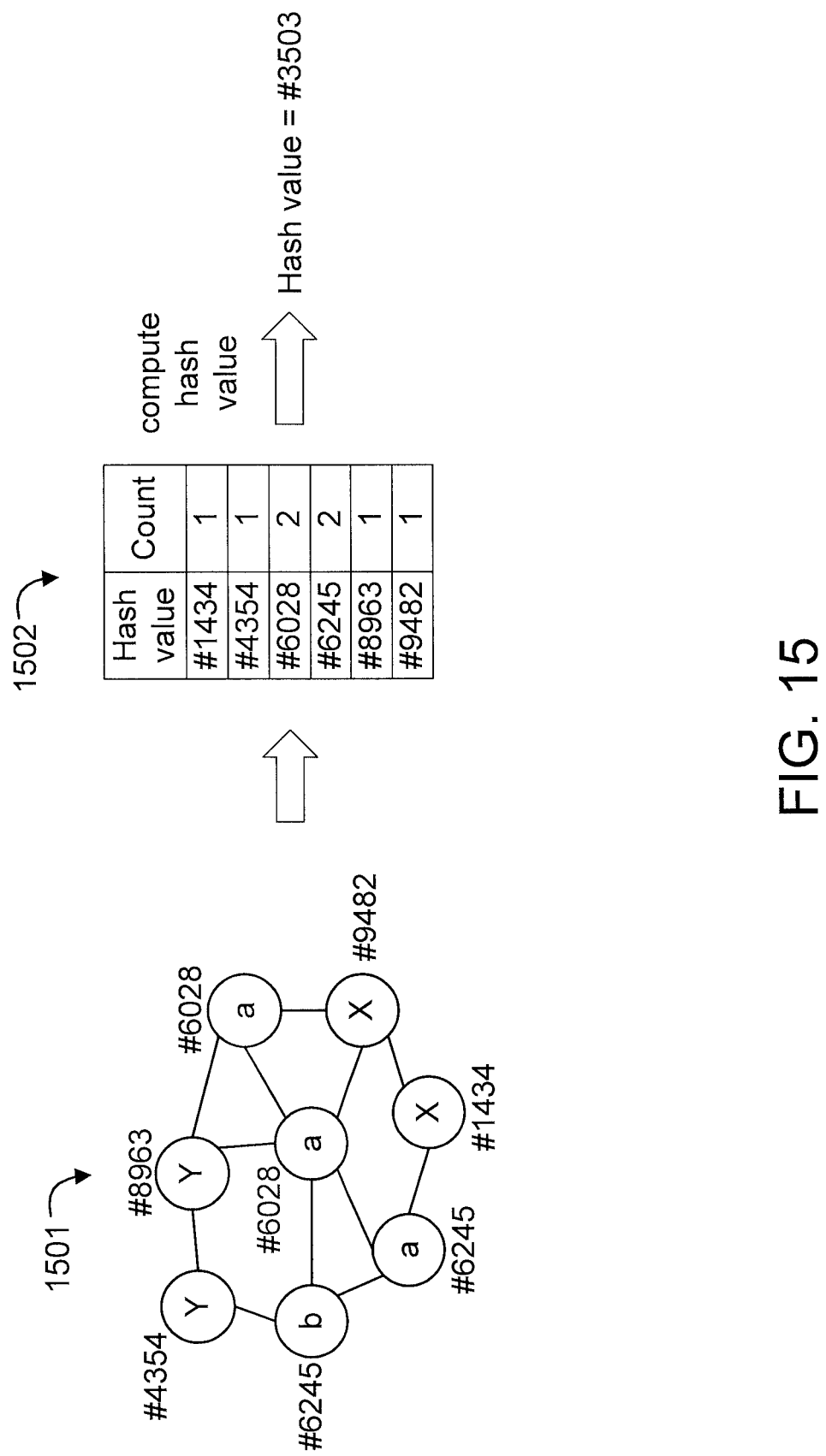
FIG. 15 graphically shows the method of FIG. 14, in accordance with an embodiment of the present invention.

FIG. 14 shows an exemplary method 1400 for computing a hash value from a graph and an exemplary post-method step 1499, in accordance with an embodiment of the present invention. FIG. 15 graphically shows the method 1400 of FIG. 14, in accordance with an embodiment of the present invention.

In an embodiment, an input to method 1400 includes: (i) an, input graph 1501 such that each vertex is labelled (by a soft-label or a hard-label); and (ii) a positive integer parameter T to specify the number of iterations of the loop.

In an embodiment, an output from method 1400 is a graph hash value computed from a table 1502 created front the (input) graph, where the table 1502 is in a sorted order.

At step 1410, set t=0.

At step 1420, initialize hash values.

At step 1430, update, the hash values.

At step 1440, increment t, such that t=t+1.

At step 1450, determine whether t<T. If so, then return to step 1430. Otherwise, continue to step 1460.

At step 1460, output the graph hash value.

At step 1499, perform an action based on the output (of step 1460). For example, in an embodiment, the action is a control action on a controlled system, machine, and/or device (e.g., element 320 in FIG. 3) that is based on the output. In an embodiment, the action involves storing the graph using a Bloom filter, where the output graph hash value is, used as an index for storing the graph, in the Bloom filter.

Regarding method 1400, we use the same procedures for "initializing hash values" (step 1420) and "updating the hash values" (step 1430) as performed in steps 420 and 460 of the method 400 of FIGS. 4-5, respectively.

Regarding step 1460, we compute a table from the hash values associated with the vertices in a sorted order of hash values (ignoring the labels), and compute an output hash value from the table.

Further regarding method 1400, the same can be used as random number generator, where each outputted graph hash value at step 1460 can be considered a random number generated by method 1400.

A description will now be given regarding exemplary extensions of the present invention. Of course, it is to be appreciated that the present principles are not limited to solely the following extensions and, thus, other extensions can also be used, as readily determined by one of ordinary skill in the art given the teachings of the present invention provided herein, while maintaining the spirit of the present invention.

One extension, which is easily implemented, is to extend the present invention for directed graphs. For example, for a simple implementation, we can ignore the direction of the edges. For another implementation, we can create two tables for out-going and in-coming edges separately and combine them when we update the hash value In many applications, we need a data structure such as Bloom Filter to store labelled graphs. To construct such data structure, we need a hash function whose input is a labelled graph. The hash function can be easily constructed by modifying the proposed method 400 of FIGS. 4-5 to obtain method 1300 of FIG. 13.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or liter developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort, or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage, or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud, bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 16:
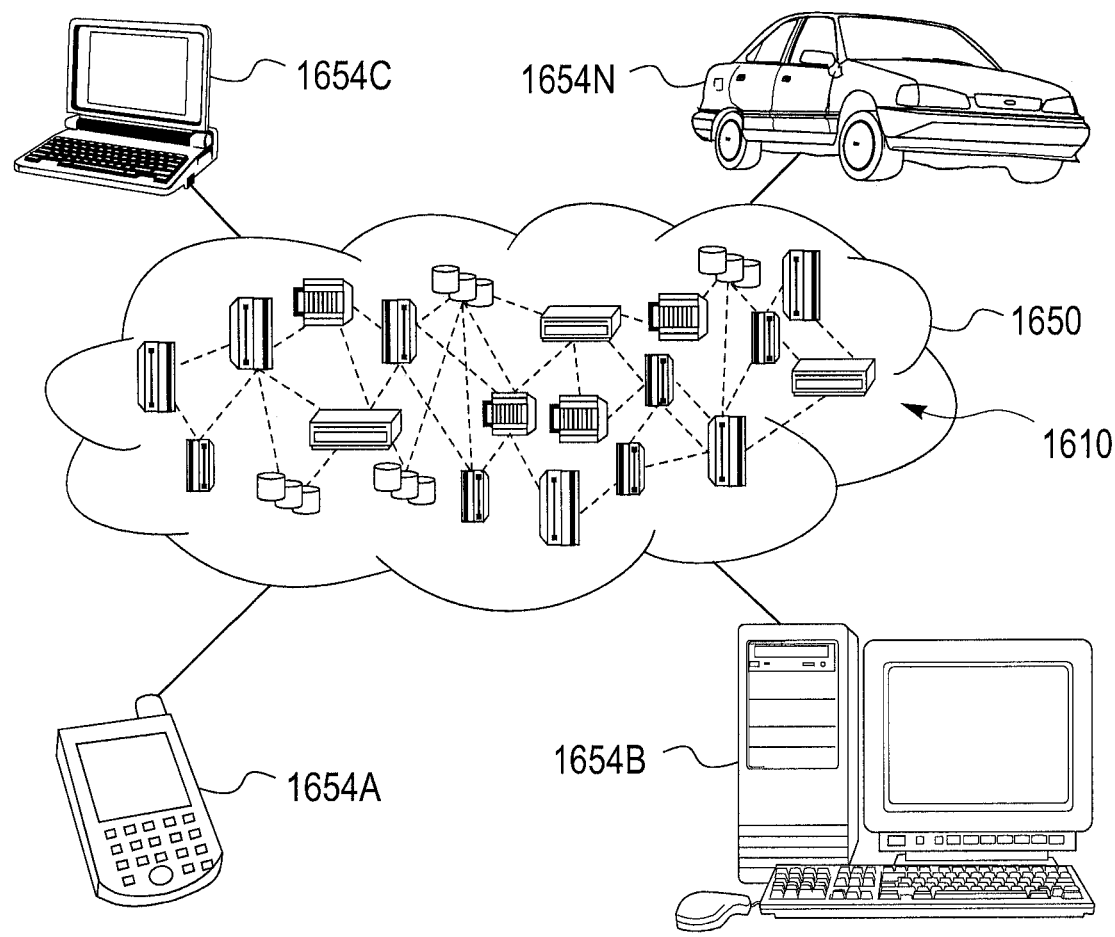
FIG. 16 shows a cloud computing, environment, in accordance with an embodiment of the present invention.

Referring now to FIG. 16, illustrative cloud computing environment 1650 is depicted. As shown, cloud computing environment 1650 includes one or more cloud computing nodes 1610 with which local computing devices used by cloud consumers, such as, for example, personal digital assistant (PDA) or cellular telephone 1654A, desktop computer 1654B, laptop computer 1654C, and/or automobile computer system 1654N may communicate. Nodes 1610 may communicate with one another. They may be grouped (not shown) physically or virtually, in one or more networks, such as Private, Community, Public, or Hybrid clouds as described hereinabove, or a combination thereof. This allows cloud computing environment 1650 to offer infrastructure, platforms and/or software as services for which a cloud consumer does not need to maintain resources on a local computing device. It is understood that the types of computing devices 1654A-N shown in FIG. 16 are intended to be illustrative only and that computing nodes 1610 and cloud computing environment 1650 can communicate with any type of computerized device over any type of network and/or network addressable connection (e.g., using a web browser).

Figure 17:
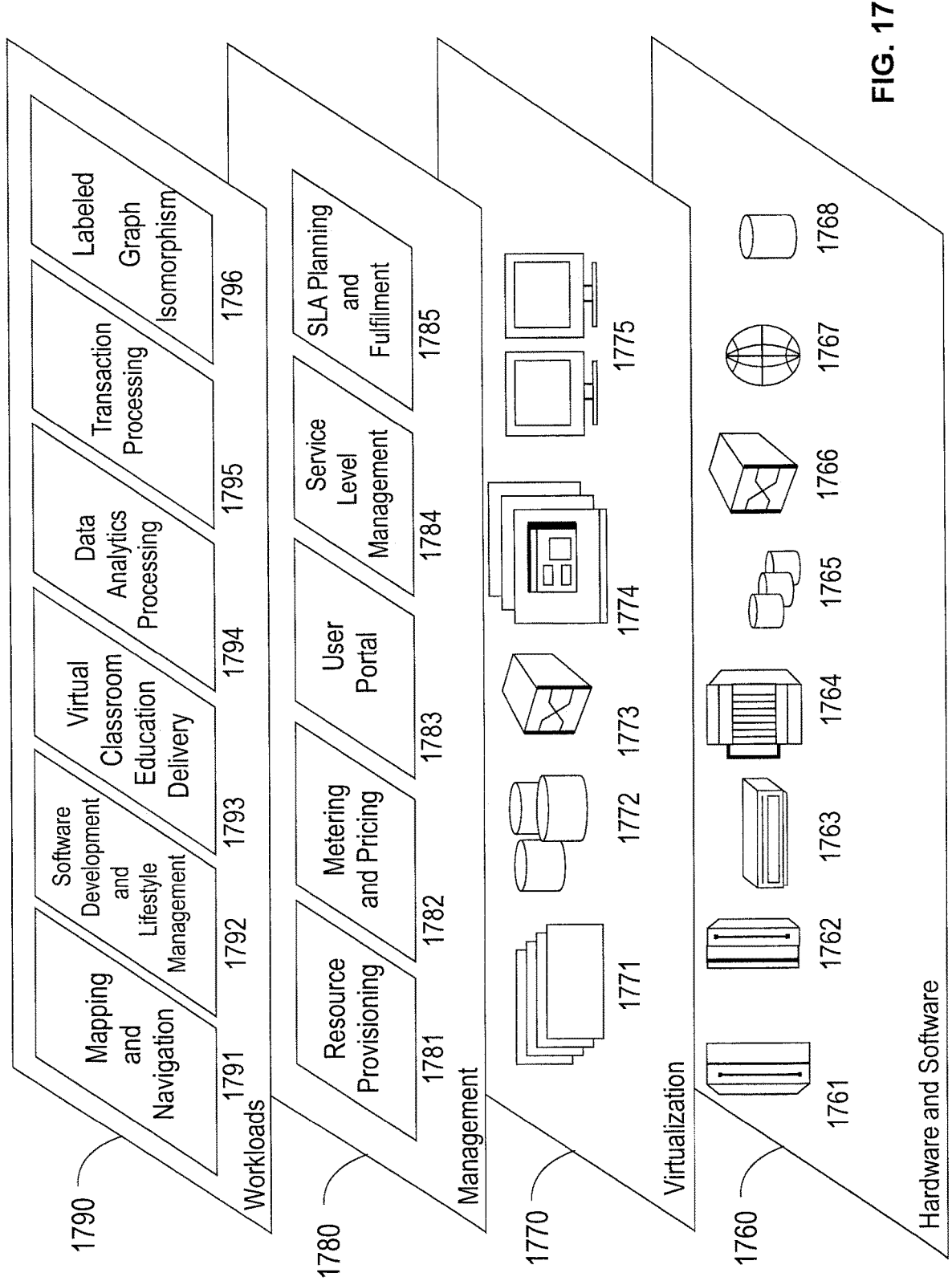
FIG. 17 shows abstraction model layers, in accordance with an embodiment of the present invention.

Referring now to FIG. 17, a set of functional abstraction layers provided by cloud computing environment 1650 (FIG. 16) is shown. It should be understood in advance that the components, layers, and functions shown in FIG. 17 are intended to be illustrative only and embodiments of the invention are not limited thereto. As depicted, the following layers and corresponding functions are provided:

Hardware and software layer 1760 includes hardware and software components. Examples of hardware components include: mainframes 1761; RISC (Reduced Instruction Set Computer) architecture based servers 1762; servers 1763; blade servers 1764; storage devices 1765; and networks and networking components 1766. In some embodiments, software components include network application server software 1767 and database software 1768.

Virtualization layer 1770 provides an abstraction layer from which the following examples of virtual entities may be provided: virtual servers 1771; virtual storage 1772; virtual networks 1773, including virtual private networks; virtual applications and operating systems 1774; and virtual clients 1775.

In one example, management layer 1780 may provide the functions described below. Resource provisioning 1781 provides dynamic procurement of computing resources and other resources that are utilized to perform tasks within the cloud computing environment. Metering and Pricing 1782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1783 provides access to the cloud computing environment for consumers and system administrators. Service level management 1784 provides cloud computing resource allocation and management such that required service levels are met. Service Level Agreement (SLA) planning and fulfillment 1785 provide pre-arrangement for, and procurement of cloud computing resources for which a future requirement is anticipated in accordance with an SLA.

Workloads layer 1790 provides examples of functionality for which the cloud computing environment may be utilized. Examples of workloads and functions which may be provided from this layer include: mapping and navigation 1791; software development and lifecycle management 1792; virtual classroom education delivery 1793; data analytics processing 1794; transaction processing 1795; and labeled graph isomorphism allowing for false positive 1796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a Wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network. (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable, program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in, a particular manner, such that the computer readable storage medium having instructions stored, therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also, be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B), As a further example, in the case of "A, B, and/or C" and "at least one of A, B, and C", such phrasing is intended to encompass the selection of the first listed option (A) only, or the selection of the second listed option (B only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are, intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the an ended

What is claimed is:

1. A computer-implemented method for determining graph isomorphism, the method comprising:
   initializing, by a processor, a hash value for each of a plurality of vertexes in a first labelled graph and a second labelled graph by assigning an integer value as the hash value, to form a first set of hash values for the vertexes in the first labelled graph and a second set of hash values for the vertexes in the second labelled graph, wherein the integer value for a given vertex from among the plurality of vertexes is assigned based on a label of the given vertex in a corresponding one of the first and the second labelled graphs while excluding adjacent vertex labels from any resultant assignment;
   performing, by the processor, a determination of whether the first labelled graph and the second labelled graph are isomorphic, by comparing the first set of hash values to the second set of hash values; and
   initiating, by the processor, a performance of an action that changes a state of a controlled object to another state, responsive to a result of the determination,
   wherein each of the first labelled graph and the second labelled graph include a mixture of hard-labels comprising unique integers and soft-labels comprising common integers, wherein the determination results in the first and second labelled graphs being isomorphic when the hard labels therebetween match irrespective of matching status of the soft labels.

2. The computer-implemented method of claim 1, wherein the integer value for the given vertex is assigned further based on a position of the given vertex in a corresponding one of the first and the second labelled graphs.

3. The computer-implemented method of claim 1, further comprising assigning a respective distinct integer value to each of the hard-labels and a common integer value to all of the soft-labels.

4. The computer-implemented method of claim 3, wherein the respective distinct integer value assigned to each of the hard-labels and the common integer value assigned to all of the soft-labels each comprise a respective random integer value.

5. The computer-implemented method of claim 1, wherein, for the given vertex, the integer value assigned as the hash value is equal to a degree of the given vertex.

6. The computer-implemented method of claim 1, wherein the hash value for the given vertex is updated based on a vertex specific table created for the given vertex and a previous hash value for the given vertex, wherein the vertex specific table created for the given vertex stores information for a neighborhood of the given vertex.

7. The computer-implemented method of claim 6, wherein the information for the neighborhood of the given vertex comprises a number of occurrences of label and hash value pairs in the neighborhood of the given vertex.

8. The computer-implemented method of claim 7, wherein the method further comprises assigning integers to the hard-labels and the soft-labels, and wherein said updating step further comprises, for the given vertex:
replacing the hard-labels and the soft-labels in the vertex specific table with the integers assigned thereto; and
sorting the rows of the vertex specific table using columns of the vertex specific table as sort-keys,
wherein the hash value for the given vertex is updated based on the sorted vertex specific table and the previous hash value.

9. The computer-implemented method of claim 6, wherein the method is an iterative method that updates the hash value for each of the plurality of vertexes until a predetermined condition is reached.

10. The computer-implemented method of claim 6, wherein said updating step is only performed responsive to a result of the determination indicating non-isomorphism.

11. The computer-implemented method of claim 6, wherein said updating step uses a hash function such that updated hash values output therefrom are consistent even when any of the soft-labels are renamed.

12. A computer-implemented method for storing a labelled graph using a Bloom filter, the method comprising:
initializing, by a processor, a hash value for each of a plurality of vertexes in a labelled graph by assigning an integer value as the hash value, wherein the integer value for a given vertex from among the plurality of vertexes is assigned based on a label and a position of the given vertex in the labelled graph while excluding adjacent vertex labels from any resultant assignment, wherein the labelled graph include a mixture of hard-labels and soft-labels;
updating the hash value for the each of the plurality of vertexes, wherein the hash value for the given vertex is updated based by replacing the hard-labels and the soft-labels in a vertex specific table created for the given vertex with integers assigned thereto, and sorting rows of the vertex specific table using columns of the vertex specific table as sort-keys, wherein the hash value for the given vertex is updated based on the sorted vertex specific table and the previous hash value;
computing an output graph hash value based on the updated hash value
initiating, by the processor, a performance of an action that changes a state of a controlled object to another state, responsive to the updated hash value; and
storing the labeled graph in the Bloom filter, using the output graph hash value as an index for the labelled graph in the Bloom filter.

13. The computer-implemented method of claim 12, wherein the method further comprises assigning a respective distinct integer value to each of hard-labels and a common integer value to all of soft-labels.

14. The computer-implemented method of claim 13, wherein the respective distinct integer value assigned to each of the hard-labels and the common integer value assigned to all of the soft-labels each comprise a respective random integer value.

15. The computer-implemented method of claim 12, wherein, for the given vertex, the integer value assigned as the hash value is equal to a degree of the given vertex.

16. The computer-implemented method of claim 12, wherein the method is an iterative method that updates the hash value for each of the plurality of vertexes until a predetermined condition is reached.

17. The computer-implemented method of claim 12, wherein said updating step uses a hash function such that updated hash values output therefrom are consistent even when any of soft-labels are renamed.

18. A computer-implemented method for determining graph isomorphism, the method comprising:
initializing, by a processor, a hash value for each of a plurality of vertexes in a first labelled graph and a second labelled graph by assigning an integer value as the hash value, to form a first set of hash values for the vertexes in the first labelled graph and a second set of hash values for the vertexes in the second labelled graph, wherein the integer value for a given vertex from among the plurality of vertexes is assigned based on a label of the given vertex in a corresponding one of the first and the second labelled graphs while excluding adjacent vertex labels from any resultant assignment, and wherein each of the first labelled graph and the second labelled graph include a mixture of hard-labels and soft-labels;
performing, by the processor, a determination of whether the first labelled graph and the second labelled graph are isomorphic, by comparing the first set of hash values to the second set of hash values;
initiating, by the processor, a performance of an action that changes a state of a controlled object to another state, responsive to a result of the determination; and
updating the hash value for each of the plurality of vertexes, wherein the hash value for the given vertex is updated by replacing the hard-labels and the soft-labels in the vertex specific table with integers assigned thereto, and sorting the rows of the vertex specific table using columns of the vertex specific table as sort-keys, wherein the hash value for the given vertex is updated based on the sorted vertex specific table and the previous hash value.

* * * * *